Sept. 14, 1937.   E. G. LOGAN   2,093,132
MINNOW BUCKET
Filed June 16, 1936   2 Sheets-Sheet 1

Inventor
Elbert Guy Logan
By Clarence A. O'Brien
Hyman Berman
Attorneys

Sept. 14, 1937.　　　　　E. G. LOGAN　　　　　2,093,132
MINNOW BUCKET
Filed June 16, 1936　　　2 Sheets-Sheet 2

Inventor
Elbert Guy Logan
By Clarence A. O'Brien
Hyman Berman
Attorneys

Patented Sept. 14, 1937

2,093,132

UNITED STATES PATENT OFFICE 2,093,132

MINNOW BUCKET

Elbert Guy Logan, Springfield, Mo.

Application June 16, 1936, Serial No. 85,588

4 Claims. (Cl. 43—56)

This invention relates to improvements in fishermen's minnow-buckets and more particularly to that type of bucket which consists of an outer receptacle having slidably fitting therein a tray to facilitate raising the minnows to the top of the bucket where they are more readily accessible and can be selected as found desirable according to size, etc.

The present invention together with its objects and advantages will be best understood from a study of the following description taken in connection with the accompanying drawings wherein:—

Figure 4 is a perspective view of a slightly modified form of the bucket.

Figure 1:
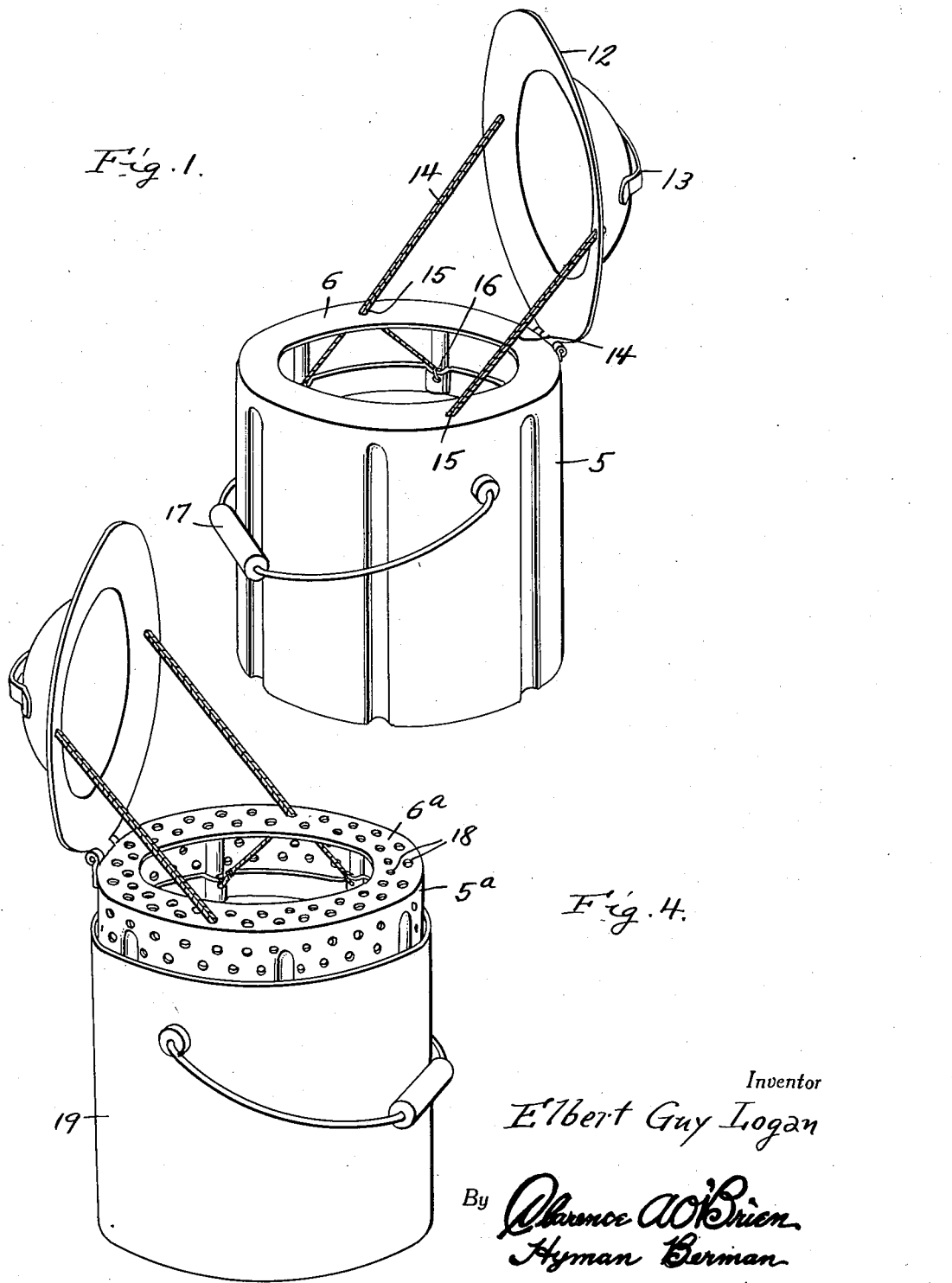
Figure 1 is a perspective view of a minnow-bucket embodying the features of the present invention.

Referring to the drawings by reference numerals it will be seen that the improved bucket comprises a main bucket or receptacle 5 which is preferably cylindrical and includes a bottom wall, a peripheral wall, and an inturned circular flange 6 at the upper edge of the peripheral wall of the bucket.

Slidably fitting within the bucket 5 is a circular tray 7 which in the present instance is shown to consist of an annular flange to which the bottom 8 is secured and from which annular frame rises a flange or peripheral wall 9. The bottom 8 is preferably made of wire or other suitable reticulated material.

For guiding the tray 7 and to prevent rotative movement of the tray within the bucket 5 the peripheral wall of the bucket 5 has pressed inwardly therefrom or otherwise formed interiorly of the bucket guide ribs 10, while the peripheral wall 9 of the tray 7 is complementarily formed as at 11 to present grooves receiving the ribs 10 as clearly shown.

For the bucket 5 there is also provided a lid 12 equipped with a handle 13. The center portion of the lid 12 is dome-shaped to provide an air pocket in the top of the bucket when the lid is in closed position.

Flexible elements such as ropes, chains or the like 14 are secured at one end to the flange portion of the lid 12 at diametrically opposite points on the lid and are trained through openings 15 provided in the top flange 6. The elements 14 have ends suitably secured as at 16 to the peripheral wall 9 of the tray 7, so that as the lid 12 is swung to the open position shown in full line in Figure 1 and by dotted lines in Figure 2 the tray 7 is forced to move upwardly to the position shown in Figure 1, and by dotted lines in Figure 2, carrying with it the minnow-contents of the bucket so that the minnows may be readily accessible when the lid 12 is raised thus permitting the fisherman to make a desired selection. Obviously as the lid 12 moves to a closed position tray 7 by its own weight will move downwardly to rest on the bottom of the bucket 5 as shown in Figure 2.

It will of course be understood that the bucket 5 will be filled to a suitable level with water for maintaining the minnows alive.

Also, if desired, and as shown in Figure 1, the bucket 5 may be provided in any suitable manner with a suitable bail 17.

Figure 2:
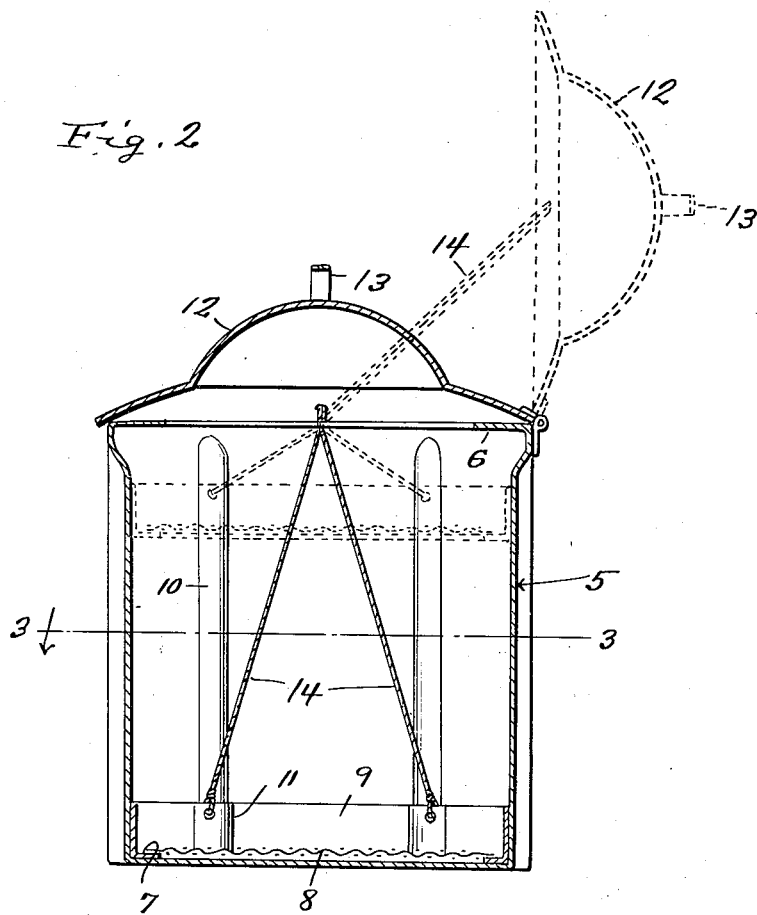
Figure 2 is a vertical sectional view through the bucket.
Figure 3:
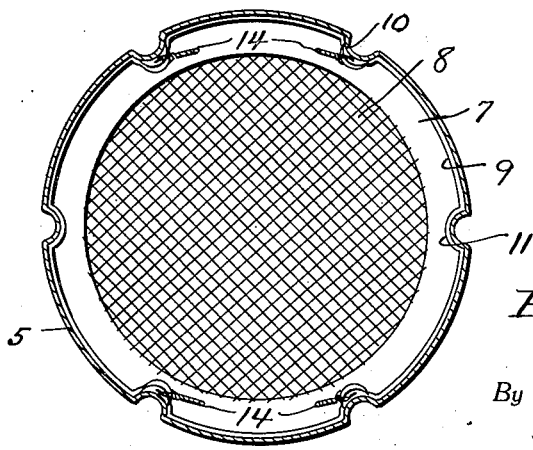
Figure 3 is a horizontal sectional view taken substantially on the line 3—3 of Figure 2.

The form of the invention shown in Figure 4 differs from that shown in Figures 1 to 3 inclusive only in that the bucket therein indicated by the reference numeral 5a has the peripheral wall thereof, and also the top flange 6a thereof perforated as at 18. Where a perforated bucket such as shown in Figure 4 is used the bucket may be placed in any suitable pail or receptacle 19 as will be necessary of course for retaining the water contents in the perforated bucket 5a.

It is thought that the utility and advantages of a minnow-bucket embodying the features of the present invention will be apparent to those skilled in the art without a more detailed description.

Having thus described the invention what is claimed as new is:—

1. In a minnow-bucket having a peripheral wall provided at its upper edge with an inturned flange, a lid for the bucket hinged to said peripheral wall, a tray having a sliding fit within said bucket, said flange being provided at diametrically opposite sides of the bucket with openings, and flexible elements trained through said openings and connected at one end with the lid, and at the opposite end with said tray for transmitting movement of the lid to the tray for raising the latter incidental to a swinging movement of the lid to open position.

2. In a minnow-bucket having a peripheral wall and a hinged lid, said peripheral wall being provided internally with a series of circumferentially spaced vertical ribs, a tray having a sliding fit within said bucket and provided with a peripheral wall having a series of relatively circumferentially spaced grooves receiving said ribs for cooperation with the latter to guide the tray as the latter moves perpendicularly within the bucket and to retain the tray against rotative movement within the bucket, and means operatively connecting the lid with the tray for elevating the tray incidental to a swinging movement of the lid to open position.

3. In a minnow bucket, a perforated receptacle, a lid for the bucket hinged to the wall of the bucket, a tray having a sliding fit within said bucket, inter-engaging means circumferentially spaced on the wall of the receptacle and on the wall of the tray for guiding the tray in its movement perpendicularly within the receptacle and to retain the tray against rotative movement within the receptacle, and flexible elements connected at one end with the lid and at the other end to the tray for elevating the tray incidental to a swinging movement of the lid to open position.

4. In a minnow bucket having a perforated peripheral wall provided at its upper edge with a perforated inturned flange, a lid for the bucket hinged to said peripheral wall, a tray having a sliding fit within the bucket, and flexible elements trained through certain of the perforations in the flange of the bucket and connected at one end with the lid and at an opposite end with the tray for raising the latter incidental to a swinging movement of the lid to open position.

ELBERT GUY LOGAN.